United States Patent
Kambadahalli Gangappa et al.

(10) Patent No.: US 12,339,763 B2
(45) Date of Patent: Jun. 24, 2025

(54) AUTOMATED TEST GENERATION

(71) Applicant: Hamilton Sundstrand Corporation, Charlotte, NC (US)

(72) Inventors: Prashanthkumar Kambadahalli Gangappa, Bengaluru (IN); Harishbhai Kanubhai Patel, Gujarat (IN); Santhoshkumar Maddula, Karnataka (IN); Asha Rani Ramappa, Bangalore (IN); Manjunath Rajashekar, Bangalore (IN); Chethan Kumar Chikkabhandara Basavarajaiah, Karnataka (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 160 days.

(21) Appl. No.: 18/185,629

(22) Filed: Mar. 17, 2023

(65) Prior Publication Data
US 2024/0241816 A1   Jul. 18, 2024

(30) Foreign Application Priority Data
Jan. 18, 2023 (IN) .............................. 202311003610

(51) Int. Cl.
*G06F 11/36* (2025.01)
*G06F 11/3668* (2025.01)

(52) U.S. Cl.
CPC ...... *G06F 11/3684* (2013.01); *G06F 11/3676* (2013.01); *G06F 11/3688* (2013.01)

(58) Field of Classification Search
CPC ............. G06F 11/3684; G06F 11/3676; G06F 11/3688
See application file for complete search history.

(56) References Cited

U.S. PATENT DOCUMENTS 3,790,885 A * 2/1974 James ............ G01R 31/318541
714/738
9,639,442 B2   5/2017 Selvaraj et al.
(Continued)

FOREIGN PATENT DOCUMENTS

CN       104063314 A *  9/2014
CN       113220566 A *  8/2021 .......... G06F 11/3684
(Continued)

OTHER PUBLICATIONS

PDF Engilsh version of Kumagai et al. JP 2004234066 A, Database Management Method, Its Operation System, and Its Processing Program (Year: 2004).*
(Continued)

*Primary Examiner* — S. Sough
*Assistant Examiner* — Mohammad H Kabir
(74) *Attorney, Agent, or Firm* — CANTOR COLBURN LLP

(57) ABSTRACT

An automated test generation system includes a processing system and a memory system in communication with the processing system. The memory system stores instructions of an automated test generator that when executed result in parsing a test input sheet to identify one or more inputs, outputs, and expressions that define software requirements in a logical form with respect to the inputs, accessing a data dictionary to determine limits of the inputs, applying test case generation rules to produce test cases to test whether a software configuration item under test meets the software requirements, and applying test script generation rules to produce test scripts that implement the test cases by setting values of the inputs to the software configuration item under test based on the limits and the expressions to verify the outputs.

20 Claims, 6 Drawing Sheets

(56) References Cited

U.S. PATENT DOCUMENTS

| | | | |
|---|---|---|---|
| 9,665,350 B1 | | 5/2017 | Kalmar et al. |
| 9,710,367 B1 | | 7/2017 | Nagineni |
| 10,846,059 B2 | * | 11/2020 | Schlight .................... G06F 8/73 |
| 2008/0005710 A1 | * | 1/2008 | Fomaciari ........... G06F 30/3312 |
| | | | 716/108 |
| 2017/0293549 A1 | * | 10/2017 | Yu ....................... G06F 11/3604 |
| 2018/0300226 A1 | * | 10/2018 | Manolios .................. G06F 8/00 |
| 2018/0349256 A1 | * | 12/2018 | Fong .................... G06F 40/284 |

FOREIGN PATENT DOCUMENTS

| | | | | | |
|---|---|---|---|---|---|
| CN | 113238932 A | | 8/2021 | | |
| EP | 3206129 A1 | | 8/2017 | | |
| EP | 3572945 A1 | * | 11/2019 | .......... | G06F 11/2273 |
| JP | H056291 A | * | 1/1993 | ............ | G06F 11/26 |
| JP | 2004234066 A | * | 8/2004 | ............ | G06F 17/30 |

OTHER PUBLICATIONS

PDF English version of Li et al. EP-3572945 A1, System and Method for Safety-Critical Software Automated Requirements-Based Test Case Generation (Year: 2019).*
PDF English version of Karikomi et al. (JP H056291 A1), Method for Preparing and Managing Test Resources (Year: 1993).*
PDF English version of Liu et al. CN 113220566 A1, Generation Method Of Interface Performance Test Script, Device And Computer Device (Year: 2021).*
PDF Engilish version of Wang et al. CN 104063314 A, A Test Data Automatic Generating Device And Method (Year: 2014).*
European Search Report for Application No. 23216898.9, mailed Jun. 10, 2024, 8 pages.

* cited by examiner

| Req Id | Input1 | Input1-Value | Input2 | Timing | Expression | Output-1 | Output-1 Value | Requirement Expected Value |
|---|---|---|---|---|---|---|---|---|
| REQ-1 | Input-Var-1 Input-Var-2 | FALSE TRUE | NA | NA | (Opcode_1 == False And Opcode_1 == True) | Out-1 | NA | NA |

| Requirement_Type | Applicability | Package | test Framework | Output-Previous | Recursive | STP Start ID | while_outer |
|---|---|---|---|---|---|---|---|
| Set | LRU | as per defined in requirements | GCU/ BPCU | NA | NA | STP Starting ID | NA |

FIG. 3

AUTOMATED TEST GENERATION

CROSS-REFERENCE TO RELATED APPLICATIONS

This application claims the benefit of IN Application No. 202311003610 filed Jan. 18, 2023, the disclosure of which is incorporated herein by reference in its entirety.

BACKGROUND

The present disclosure relates to testing systems, and more particularly, to automated test generation.

Formal software development processes include the creation of software requirements, the creation of software code to implement the requirements, and testing of the resulting software to verify that the software meets the requirements. This is typically a manual process where software systems engineers develop software requirements, software designers develop the software into executable code, and software test engineers design tests to verify that the software meets the requirements. For large-scale development projects, the complexity of testing software at multiple levels, such as a software unit level, a functional level, and end-to-end testing can present technical challenges.

BRIEF DESCRIPTION

According to some embodiments of the present disclosure, an automated test generation system includes a processing system and a memory system in communication with the processing system. The memory system stores instructions of an automated test generator that when executed by the processing system result in parsing a test input sheet to identify one or more inputs, one or more outputs, and one or more expressions that define one or more software requirements in a logical form with respect to the one or more inputs, accessing a data dictionary to determine one or more limits of the one or more inputs, applying a plurality of test case generation rules to produce one or more test cases to test whether a software configuration item under test meets the one or more software requirements, and applying a plurality of test script generation rules to produce one or more test scripts that implement the one or more test cases by setting values of the one or more inputs to the software configuration item under test based on the one or more limits and the one or more expressions to verify the one or more outputs.

In addition to one or more of the features described herein, or as an alternative, further embodiments can include where the test input sheet defines a timing constraint of at least one of the one or more software requirements, the test case generation rules are configured to generate two or more test cases to verify whether the timing constraint is met, and the test script generation rules are configured to generate two or more test scripts to verify whether the timing constraint is met.

In addition to one or more of the features described herein, or as an alternative, further embodiments can include where the data dictionary defines a timing constraint of at least one of the one or more inputs, the test case generation rules are configured to generate two or more test cases to verify whether the timing constraint is met, and the test script generation rules are configured to generate two or more test scripts to verify whether the timing constraint is met.

In addition to one or more of the features described herein, or as an alternative, further embodiments can include where the test input sheet defines an input dependency between at least two inputs, the test case generation rules are configured to generate two or more test cases to verify the input dependency, and the test script generation rules are configured to generate two or more test scripts to verify the input dependency.

In addition to one or more of the features described herein, or as an alternative, further embodiments can include where the one or more test cases document a plurality of steps to implement a test, and the one or more test scripts set one or more environmental variables and trigger test execution.

In addition to one or more of the features described herein, or as an alternative, further embodiments can include where the automated test generator is configured to extract unit information and software scaling factor from the data dictionary and incorporate the unit information and software scaling factor in the one or more test cases and the one or more test scripts.

In addition to one or more of the features described herein, or as an alternative, further embodiments can include where the automated test generator is configured to generate the one or more test cases and the one or more test scripts as one or more multi-cycle tests for delayed output verification or sequential output verification.

In addition to one or more of the features described herein, or as an alternative, further embodiments can include where the automated test generator is configured to generate the one or more test cases and the one or more test scripts as latching tests based on determining that the one or more software requirements include a latching requirement to set, hold, and reset at least one of the one or more outputs.

In addition to one or more of the features described herein, or as an alternative, further embodiments can include where the automated test generator is configured generate the one or more test cases and the one or more test scripts based on determining modified condition and decision coverage for the one or more expressions.

In addition to one or more of the features described herein, or as an alternative, further embodiments can include where the automated test generator is configured generate the one or more test cases and the one or more test scripts with boundary range tests based on one or more range values from the data dictionary.

According to an aspect, a method of automated test generation includes parsing, by an automated test generator executing on a processing system, a test input sheet to identify one or more inputs, one or more outputs, and one or more expressions that define one or more software requirements in a logical form with respect to the one or more inputs. The method also includes accessing, by the automated test generator, a data dictionary to determine one or more limits of the one or more inputs and applying, by the automated test generator, a plurality of test case generation rules to produce one or more test cases to test whether a software configuration item under test meets the one or more software requirements. The method further includes applying, by the automated test generator, a plurality of test script generation rules to produce one or more test scripts that implement the one or more test cases by setting values of the one or more inputs to the software configuration item under test based on the one or more limits and the one or more expressions to verify the one or more outputs.

In addition to one or more of the features described herein, or as an alternative, further embodiments can include extracting, by the automated test generator, unit information and software scaling factor from the data dictionary and incorporating, by the automated test generator, the unit information and software scaling factor in the one or more test cases and the one or more test scripts.

In addition to one or more of the features described herein, or as an alternative, further embodiments can include generating, by the automated test generator, the one or more test cases and the one or more test scripts as one or more multi-cycle tests for delayed output verification or sequential output verification.

In addition to one or more of the features described herein, or as an alternative, further embodiments can include generating, by the automated test generator, the one or more test cases and the one or more test scripts as latching tests based on determining that the one or more software requirements comprise a latching requirement to set, hold, and reset at least one of the one or more outputs.

In addition to one or more of the features described herein, or as an alternative, further embodiments can include generating, by the automated test generator, the one or more test cases and the one or more test scripts based on determining modified condition and decision coverage for the one or more expressions.

In addition to one or more of the features described herein, or as an alternative, further embodiments can include generating, by the automated test generator, the one or more test cases and the one or more test scripts with boundary range tests based on one or more range values from the data dictionary.

The foregoing features and elements may be combined in various combinations without exclusivity, unless expressly indicated otherwise. Features which are described in the context of separate aspects and embodiments may be used together and/or be interchangeable. Similarly, features described in the context of a single embodiment may also be provided separately or in any suitable subcombination. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 3 depicts a portion of a test input sheet for test case and test script generation according to a non-limiting embodiment of the present disclosure;

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

DETAILED DESCRIPTION

Various non-limiting embodiments of the present disclosure provide automated test generation for software. The process of developing tests for software is typically performed by test engineers who analyze software requirements and manually write test cases. Test procedures and/or test scripts are typically manually generated to align with the manually generated test cases. The test procedures or scripts can be used to perform software testing. This can result in inefficiencies as test engineers may take different approaches to testing portions of the same large-scale software item. Accordingly, some conditions may be missed and other conditions may end up getting tested multiple times. Further, it may take additional resources to convert the manually generated test cases into scripts to perform testing in different environments. For instance, a test that is manually written for a simulation environment may be challenging to port for use with development or production hardware.

According to aspects of the disclosure, automated test generation is provided by an automated test generation system that automates test case and test script generation. The automated generation of test cases and test scripts can increase resource utilization efficiency and reduce the risk of errors that can occur with a manual process. Further, the automated test generation can establish traceability between requirements, test cases, and test scripts to ensure that all requirements are tested in a software configuration item under test. The automated test generation can apply a consistent approach to test various types of complex software structures to ensure that modified condition and decision coverage is achieved.

Figure 1:
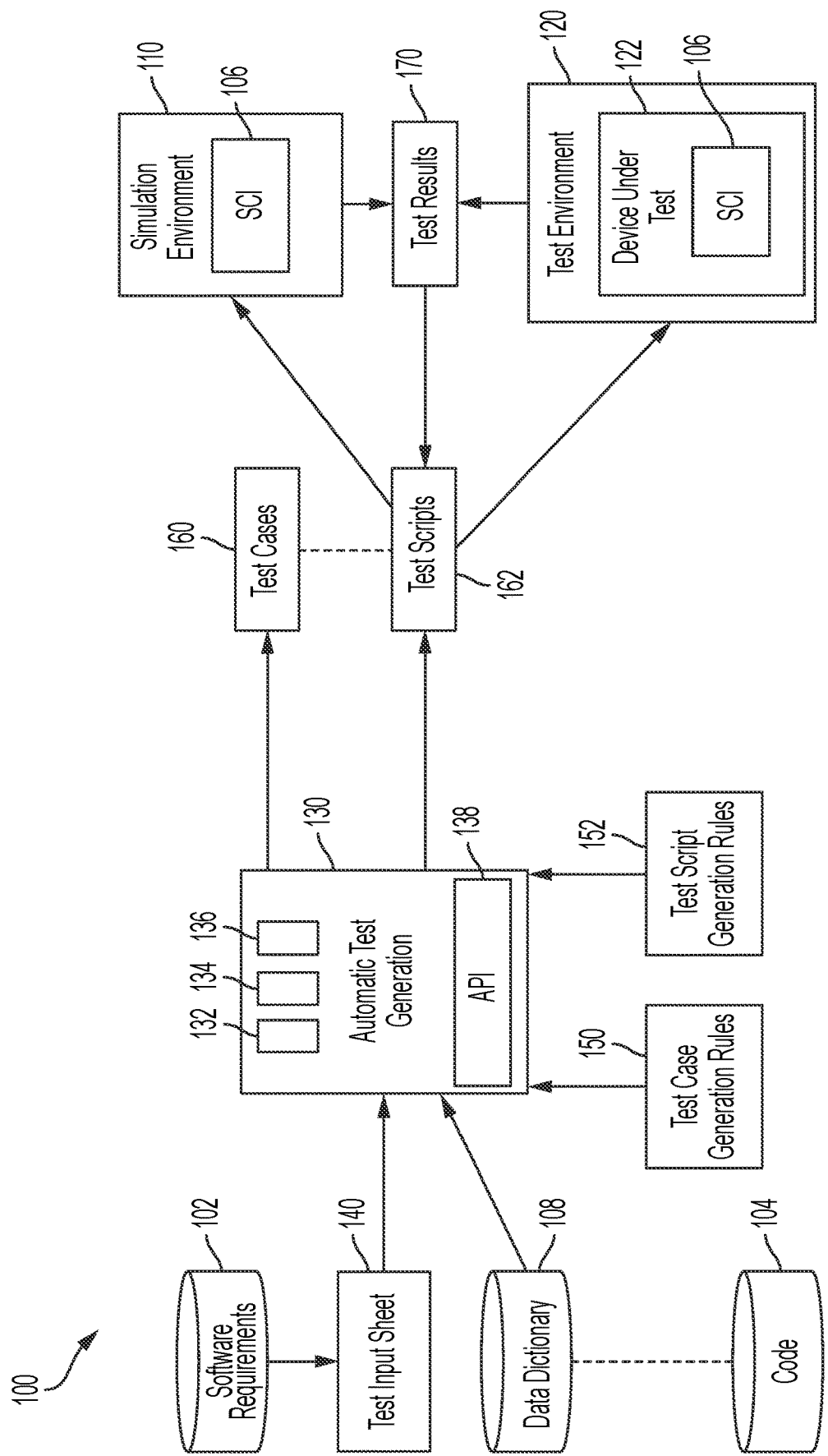
FIG. 1 is a block diagram of an automated test generation system according to a non-limiting embodiment of the present disclosure.

With reference now to FIG. 1, an automated test generation system 100 is illustrated according to a non-limiting embodiment of the present disclosure. The automated test generation system 100 can be used verify that software requirements 102 have been correctly implemented in code 104 used to create a software configuration item (SCI) 106 under test. The SCI 106 can include executable software and supporting data structures which may be tested in various environments, such as a simulation environment 110 and/or a test environment 120. The test environment 120 can include a device under test 122, such as customized hardware that is controlled by the SCI 106. For example, the device under test 122 can be a controller for a motor, an engine, or other such electromechanical system. The test environment 120 can include sensors and actuators used by the device under test 122 or signals that replicate electrical, optical, and/or acoustic characteristics of the sensors and actuators. The simulation environment 110 can be a software test system configured on a workstation or other such computer with a processor and memory that simulates aspects of the device under test 122.

Figure 2:
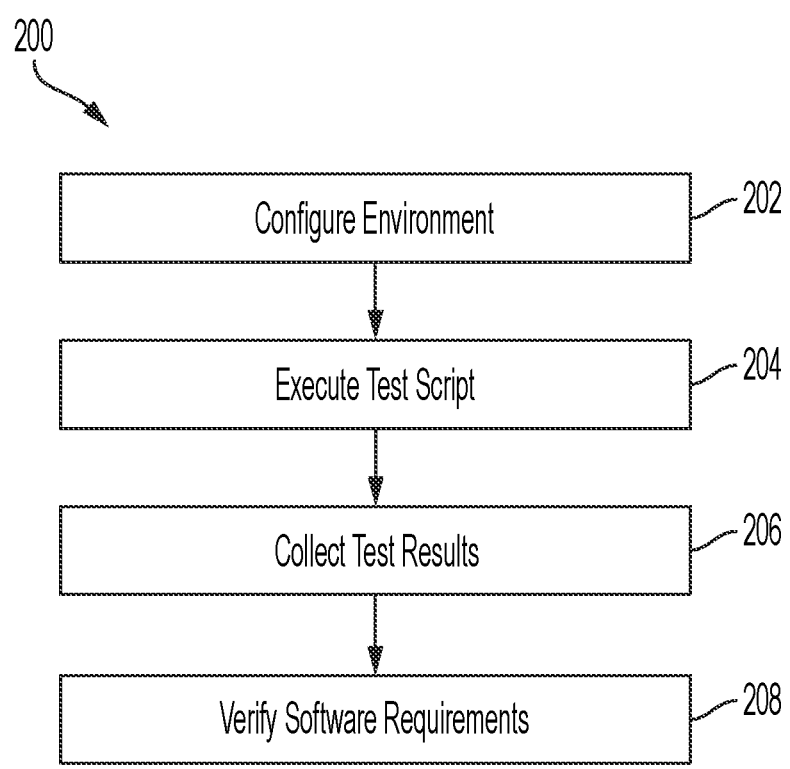
FIG. 2 is a process flow according to a non-limiting embodiment of the present disclosure.

A generalized approach to performing tests of the SCI 106 through the simulation environment 110 or the test environment 120 is illustrated in the example of process 200 of FIG. 2. At block 202, an environment is configured, such as the simulation environment 110 or the test environment 120. At block 204, a test script 162 is executed in the selected environment to exercise one or more features of the SCI 106. The test script 162 can perform a sequence of multiple test cases 160. At block 206, test results 170 are collected. In some tests, the test script 162 may use the test results 170, for instance, where intermediate outputs or past values become inputs for other tests. At block 208, the software requirements 102 are verified. The test cases 160 and test scripts 162 can define expected outcomes of test script 162 execution, and results may confirm whether the code 104 correctly implemented the software requirements 102.

With continued reference to FIG. 1, a data dictionary 108 can define input and output variables and constants used by the code 104. The data dictionary 108 can be developed in combination with the code 104. For example, in some aspects, entries in the data dictionary 108 can be used to populate portions of the code 104. In other aspects, the data dictionary 108 can document the input and output variables and constants used by the code 104 but need not have a direct link.

The automated test generation system 100 can include an automated test generator 130. The automated test generator 130 can include a processing system 132 and a memory system 134, where the memory system 134 stores executable instructions to configure the processing system 132 to perform a plurality of operations. The processing system 132 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 134 can store data and instructions that are executed by the processing system 132. In embodiments, the memory system 134 may include random access memory (RAM), read only memory (ROM), or other electronic, optical, magnetic, or any other computer readable medium onto which is stored data and algorithms in a non-transitory form. The automated test generator 130 can also include an input/output (I/O) interface 136 operable to interface with various components of the automated test generation system 100 and other system components that interface with the automated test generation system 100 through an application programming interface (API) 138.

The software requirements 102 can be parsed to identify requirements with associated inputs, outputs, expressions, timing constraints, and other such features and populate a test input sheet 140. The test input sheet 140 can provide a consistent format for documenting aspects of the software requirements 102 in a consistent format. FIG. 3 depicts a portion of a test input sheet 300 for test case generation as an example of a portion of the test input sheet 140 of FIG. 1. As depicted in the example of the test input sheet 300, fields of the test input sheet 300 can include a requirement identifier 302, a first input 304, a first input value 306, a second input 308, a timing constraint 310, an expression 312, a first output 314, a first output value 316, a requirement expected value 318, a requirement type 320, an applicability 322, a package 324, a test framework 326, a previous output field 328, a recursive field 330, a system test plan starting identifier 332, and a while-outer field 334. The requirement identifier 302 can identify one or more of the software requirements 102 being tested. The first input 304 can identify one or more inputs for testing that are time independent. The first input value 306 can include initial values for each of the one or more inputs of the first input 304. The second input 308 can identify one or more inputs having a timing dependency. The timing constraint 310 be a timing constraint of the timing dependency of the one or more inputs of the second input 308. The expression 312 can include one or more logical expressions that indicate how to logically evaluate one or more inputs (e.g., combinations of first input 304 and/or second input 308). The first output 314 can identify one or more output variables that can be set upon evaluating the expression 312. The first output value 316 can identify an output type value of the first output 314. The requirement expected value 318 indicates an expected value of the first output 314 based on the software requirements 102, and the requirement type 320 indicates whether the expected transition is a set, latch, or reset for the requirement expected value 318. The applicability 322 can identify whether the device under test 122 is targeted. The package 324 can identify whether the SCI 106 is intended to run in a test wrapper to configure the environment. The test framework 326 can identify a type of environment. The previous output field 328 can be used to perform test analysis on a previous execution cycle, such the last cycle, two cycles back, three cycles back, etc. The recursive field 330 can indicate whether one or more of the inputs is used multiple places with different values. The system test plan starting identifier 332 can include a test plan identifier. The while-outer field 334 can indicate that a variable value has an outer condition for an inner input block, such as a first state in combination with two or more conditions being maintained.

Returning to FIG. 1, the automated test generator 130 can parse the test input sheet 140 to identify the various fields stored therein. The automated test generator 130 can also access the data dictionary 108 to determine one or more characteristics of the inputs and outputs identified in the test input sheet 140. The automated test generator 130 can apply test case generation rules 150 to produce one or more test cases 160 to test whether the SCI 106 meets one or more software requirements 102. The automated test generator 130 can apply test script generation rules 152 to produce one or more test scripts 162 that implement the one or more test cases 160. The test scripts 162 can be configured for one or more environments, such as setting an environment configuration specific to the simulation environment 110 or the test environment 120. Test results 170 can be captured and used by the test scripts 162, for instance, for past value comparisons and to determine whether the software requirements 102 are met.

The test cases 160 can document initial conditions, test objectives, input conditions, and expected results in a text format that is human readable. The test scripts 162 can be in format that directly interfaces with a target environment, such as commands to set initial conditions in the simulation environment 110 and extract the test results 170 from the simulation environment 110. Similarly, the test scripts 162 can set initial conditions of the test environment 120, control select inputs with a targeted rate of change, and meet other conditions defined through the test input sheet 140. The test case generation rules 150 can define a test case template and test case expansion rules. For example, where a boundary range check is needed, the test case generation rules 150 generate test cases for each boundary. The test case generation rules 150 can also determine multiple test cases for input combinations, such as a truth table expansion, all set, all clear, walking one testing, and other such test variations. For instance a boundary value can be tested at the value, below the value, and above the value.

Figure 4:
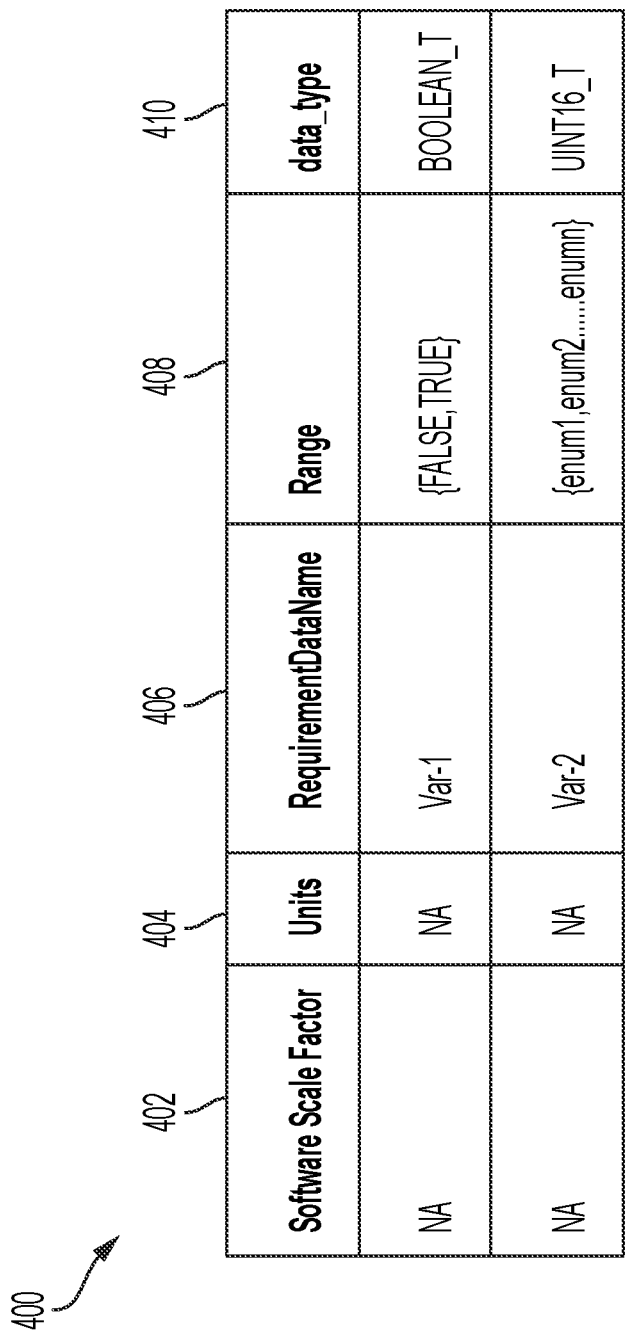
FIG. 4 depicts a data dictionary format according to a non-limiting embodiment of the present disclosure.

Range, scaling, and unit information can be extracted from the data dictionary 108 according to the test case generation rules 150 to generate the test cases 160. FIG. 4 depicts an example of a data dictionary format 400 that can be used for the data dictionary 108. The data dictionary format 400 can include, for instance, a software scale factor 402, units 404, a requirement data name 406, a range 408, and a data type 410. The software scale factor 402 can be used to determine how a raw value should be interpreted, for instance, where fixed-point math is used. The units 404 can be used to make the test cases 160 more descriptive, for instance, by including engineering units in the text. The range 408 can be used to determine a test case type and number of test cases needed. For example, a Boolean variable may have only two possible values, while an enumerated type can include a list of up to N possible values.

Figure 5:
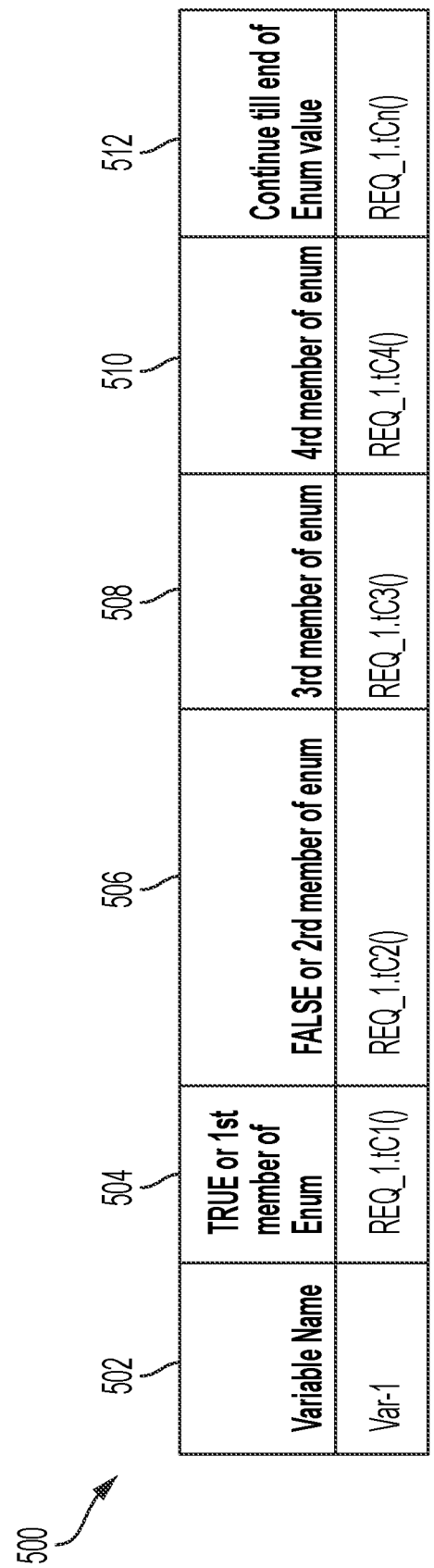
FIG. 5 depicts a dependent input format for test case and test script generation according to a non-limiting embodiment of the present disclosure.

Additional variations in the test cases 160 can be generated for dependent input cases. FIG. 5 depicts an example of a dependent input format 500 for test case generation. In the example of FIG. 5, the dependent input format 500 can define a variable name 502, a first condition 504, a second condition 506, a third condition 508, a fourth condition 510, and a continue until end condition 512. For instance, a Boolean value may have a TRUE dependency condition defined by the first condition 504 and a FALSE dependency condition defined by the second condition 506. An enumerated type may have dependency conditions sequentially defined across the first condition 504, second condition 506, third condition 508, fourth condition 510, and continue until end condition 512. The dependent input format 500 can be defined with the test input sheet 140 or elsewhere. It will be understood that the dependent input format 500 is an example for purposes of explanation and is in no way limiting. Thus, further dependency types can also be defined. The test scripts 162 can be generated using a similar approach as the test cases 160. In some aspects generation of the test scripts 162 can be independent from generation of the test cases 160. In other aspects, the test cases 160 can be converted into the test scripts 162 based on the test script generation rules 152. For instance, the test script generation rules 152 may define how to structure commands for the simulation environment 110 or the test environment 120 in JAVA or another such language known in the art.

Figure 6:
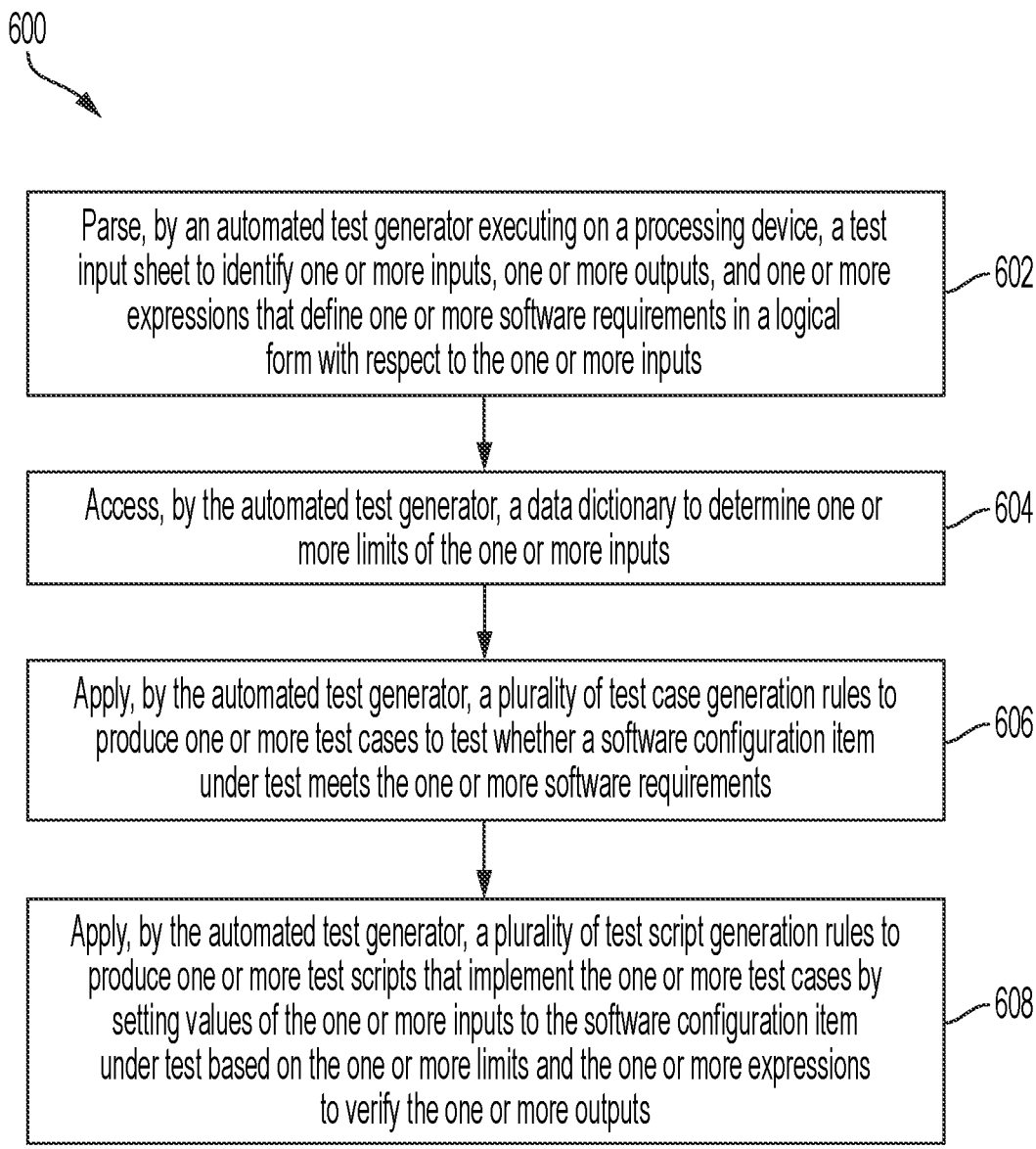
FIG. 6 depicts a process flow according to a non-limiting embodiment of the present disclosure.

FIG. 6 depicts a process flow 600 according to a non-limiting embodiment. Although depicted in a particular order, it will be understood that the steps of process flow 600 can be done in an alternate order and steps may be added or further subdivided. Process flow 600 is described in references to the automated test generator 130 of FIG. 1; however, other system configurations can also perform the process flow 600. Steps of the process flow 600 can be performed by the processing system 132 executing instructions stored in memory system 134 and/or may be implemented in hardware.

At block 602, the automated test generator 130 can parse a test input sheet 140 to identify one or more inputs, one or more outputs, and one or more expressions that define one or more software requirements 102 in a logical form with respect to the one or more inputs.

At block 604, the automated test generator 130 can access a data dictionary 108 to determine one or more limits of the one or more inputs.

At block 606, the automated test generator 130 can apply a plurality of test case generation rules 150 to produce one or more test cases 160 to test whether a software configuration item 106 under test meets the one or more software requirements 102. The one or more test cases 160 can document a plurality of steps to implement a test.

At block 608, the automated test generator 130 can apply a plurality of test script generation rules 152 to produce one or more test scripts 162 that implement the one or more test cases 160 by setting values of the one or more inputs to the software configuration item 106 under test based on the one or more limits and the one or more expressions to verify the one or more outputs. The one or more test scripts 162 can set one or more environmental variables and trigger test execution.

According to some aspects, the test input sheet 140 can define a timing constraint of at least one of the one or more software requirements 102, the test case generation rules 150 can be configured to generate two or more test cases 160 to verify whether the timing constraint is met, and the test script generation rules 152 can be configured to generate two or more test scripts 162 to verify whether the timing constraint is met. The data dictionary 108 can define a timing constraint of at least one of the one or more inputs, the test case generation rules 150 can be configured to generate two or more test cases 160 to verify whether the timing constraint is met, and the test script generation rules 152 can be configured to generate two or more test scripts 162 to verify whether the timing constraint is met. The test input sheet 140 can also define an input dependency between at least two inputs, the test case generation rules 150 can be configured to generate two or more test cases 160 to verify the input dependency, and the test script generation rules 152 can be configured to generate two or more test scripts 162 to verify the input dependency.

According to some aspects, the automated test generator 130 can be configured to extract unit information and software scaling factor from the data dictionary 108 and incorporate the unit information and software scaling factor in the one or more test cases 160 and the one or more test scripts 162. Further, the automated test generator 130 can be configured to generate the one or more test cases 160 and the one or more test scripts 162 as one or more multi-cycle tests for delayed output verification or sequential output verification. The automated test generator 130 can be configured to generate the one or more test cases 160 and the one or more test scripts 162 as latching tests based on determining that the one or more software requirements 102 include a latching requirement to set, hold, and reset at least one of the one or more outputs. The automated test generator 130 can be configured generate the one or more test cases 160 and the one or more test scripts 162 based on determining modified condition and decision coverage for the one or more expressions. The automated test generator 130 can be configured generate the one or more test cases 160 and the one or more test scripts 162 with boundary range tests based on one or more range values from the data dictionary 108.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may include a computer program product embodied in a non-transient form in one or more computer readable medium(s) having computer readable program code embodied thereon.

The terms "about" and "substantially" are intended to include the degree of error associated with measurement of the particular quantity based upon the equipment available at the time of filing the application. For example, "about" or "substantially" can include a range of ±8% or 5%, or 2% of a given value. The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure is not limited to the particular embodiment disclosed as the best mode contemplated for carrying out this present disclosure, but that the present disclosure will include all embodiments falling within the scope of the claims.

What is claimed is:

1. An automated test generation system comprising:
   a processing system; and
   a memory system in communication with the processing system, the memory system storing instructions of an automated test generator that when executed by the processing system result in:
   parsing a test input sheet to identify one or more inputs, one or more outputs, and one or more expressions that define one or more software requirements in a logical form with respect to the one or more inputs, wherein the test input sheet defines a timing constraint of at least one of the one or more software requirements;
   accessing a data dictionary to determine one or more limits of the one or more inputs;
   applying a plurality of test case generation rules to produce one or more test cases to test whether a software configuration item under test meets the one or more software requirements, wherein the test case generation rules are configured to generate two or more test cases to verify whether the timing constraint of the at least one of the one or more software requirements is met; and
   applying a plurality of test script generation rules to produce one or more test scripts that implement the one or more test cases for one or more target environments by setting values of the one or more inputs to the software configuration item under test based on the one or more limits and the one or more expressions to verify the one or more outputs, wherein the test script generation rules are configured to generate two or more test scripts to verify whether the timing constraint of the at least one of the one or more software requirements is met for the one or more target environments.

2. The automated test generation system of claim 1, wherein:
   the one or more inputs, the one or more outputs, and the one or more expressions are associated with selectively testing in a simulation environment comprised among the one or more target environments or a hardware test environment comprised among the one or more target environments, and
   the one or more test scripts comprise:
   a first test script in a format configured for directly interfacing with the simulation environment; and
   a second test script in a format configured for directly interfacing with the hardware test environment.

3. The automated test generation system of claim 1, wherein the data dictionary defines a timing constraint of at least one of the one or more inputs, the test case generation rules are configured to generate two or more test cases to verify whether the timing constraint of the at least one of the one or more inputs is met, and the test script generation rules are configured to generate two or more test scripts to verify whether the timing constraint of the at least one of the one or more inputs is met.

4. The automated test generation system of claim 1, wherein the test input sheet defines an input dependency between at least two inputs, the test case generation rules are configured to generate two or more test cases to verify the input dependency, and the test script generation rules are configured to generate two or more test scripts to verify the input dependency.

5. The automated test generation system of claim 1, wherein the one or more test cases document a plurality of steps to implement a test, and the one or more test scripts set one or more environmental variables and trigger test execution.

6. The automated test generation system of claim 1, wherein the automated test generator is configured to extract unit information and software scaling factor from the data dictionary and incorporate the unit information and software scaling factor in the one or more test cases and the one or more test scripts.

7. The automated test generation system of claim 1, wherein the automated test generator is configured to generate the one or more test cases and the one or more test scripts as one or more multi-cycle tests for delayed output verification or sequential output verification.

8. The automated test generation system of claim 1, wherein the automated test generator is configured to generate the one or more test cases and the one or more test scripts as latching tests based on determining that the one or more software requirements comprise a latching requirement to set, hold, and reset at least one of the one or more outputs.

9. The automated test generation system of claim 1, wherein the automated test generator is configured generate the one or more test cases and the one or more test scripts based on determining modified condition and decision coverage for the one or more expressions.

10. The automated test generation system of claim 9, wherein the automated test generator is configured generate the one or more test cases and the one or more test scripts with boundary range tests based on one or more range values from the data dictionary.

11. A method of automated test generation comprising:
    parsing, by an automated test generator executing on a processing system, a test input sheet to identify one or more inputs, one or more outputs, and one or more expressions that define one or more software requirements in a logical form with respect to the one or more inputs, wherein the test input sheet defines a timing constraint of at least one of the one or more software requirements;
    accessing, by the automated test generator, a data dictionary to determine one or more limits of the one or more inputs;
    applying, by the automated test generator, a plurality of test case generation rules to produce one or more test cases to test whether a software configuration item under test meets the one or more software requirements, wherein the test case generation rules are configured to generate two or more test cases to verify whether the timing constraint of the at least one of the one or more software requirements is met; and applying, by the automated test generator, a plurality of test script generation rules to produce one or more test scripts that implement the one or more test cases for one or more target environments by setting values of the one or more inputs to the software configuration item under test based on the one or more limits and the one or more expressions to verify the one or more outputs, wherein the test script generation rules are configured to generate two or more test scripts to verify whether the timing constraint of the at least one of the one or more software requirements is met for the one or more target environments.

12. The method of claim 11, wherein:

the one or more inputs, the one or more outputs, and the one or more expressions are associated with selectively testing in a simulation environment comprised among the one or more target environments or a hardware test environment comprised among the one or more target environments, and the one or more test scripts comprise:
  a first test script in a format configured for directly interfacing with the simulation environment; and
  a second test script in a format configured for directly interfacing with the hardware test environment.

13. The method of claim 11, wherein the data dictionary defines a timing constraint of at least one of the one or more inputs, the test case generation rules are configured to generate two or more test cases to verify whether the timing constraint of the at least one of the one or more inputs is met, and the test script generation rules are configured to generate two or more test scripts to verify whether the timing constraint of the at least one of the one or more inputs is met.

14. The method of claim 11, wherein the test input sheet defines an input dependency between at least two inputs, the test case generation rules are configured to generate two or more test cases to verify the input dependency, and the test script generation rules are configured to generate two or more test scripts to verify the input dependency.

15. The method of claim 11, wherein the one or more test cases document a plurality of steps to implement a test, and the one or more test scripts set one or more environmental variables and trigger test execution.

16. The method of claim 11, further comprising:
extracting, by the automated test generator, unit information and software scaling factor from the data dictionary; and
incorporating, by the automated test generator, the unit information and software scaling factor in the one or more test cases and the one or more test scripts.

17. The method of claim 11, further comprising:
generating, by the automated test generator, the one or more test cases and the one or more test scripts as one or more multi-cycle tests for delayed output verification or sequential output verification.

18. The method of claim 11, further comprising:
generating, by the automated test generator, the one or more test cases and the one or more test scripts as latching tests based on determining that the one or more software requirements comprise a latching requirement to set, hold, and reset at least one of the one or more outputs.

19. The method of claim 11, further comprising:
generating, by the automated test generator, the one or more test cases and the one or more test scripts based on determining modified condition and decision coverage for the one or more expressions.

20. The method of claim 19, further comprising:
generating, by the automated test generator, the one or more test cases and the one or more test scripts with boundary range tests based on one or more range values from the data dictionary.

* * * * *